US008682072B2

(12) United States Patent
Sengamedu et al.

(10) Patent No.: US 8,682,072 B2
(45) Date of Patent: Mar. 25, 2014

(54) IMAGE SEGMENTATION

(75) Inventors: Srinivasan H. Sengamedu, Bangalore (IN); Sravanthi Bondugula, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 1052 days.

(21) Appl. No.: 12/345,669

(22) Filed: Dec. 30, 2008

(65) Prior Publication Data
US 2010/0166325 A1 Jul. 1, 2010

(51) Int. Cl.
*G06K 9/34* (2006.01)

(52) U.S. Cl.
USPC .......................................... 382/173

(58) Field of Classification Search
USPC .................................. 382/173–176
See application file for complete search history.

(56) References Cited

U.S. PATENT DOCUMENTS

| | | | | |
|---|---|---|---|---|
| 5,710,830 A | * | 1/1998 | Holeva | 382/173 |
| 5,900,953 A | * | 5/1999 | Bottou et al. | 358/540 |
| 7,035,461 B2 | * | 4/2006 | Luo et al. | 382/167 |
| 7,218,759 B1 | * | 5/2007 | Ho et al. | 382/118 |
| 2005/0041860 A1 | * | 2/2005 | Jager | 382/173 |
| 2007/0081744 A1 | * | 4/2007 | Gokturk et al. | 382/305 |
| 2008/0095470 A1 | * | 4/2008 | Chao et al. | 382/298 |
| 2008/0170778 A1 | * | 7/2008 | Luo | 382/164 |
| 2008/0310719 A1 | * | 12/2008 | Kitora | 382/176 |
| 2008/0316328 A1 | * | 12/2008 | Steinberg et al. | 348/222.1 |
| 2009/0087024 A1 | * | 4/2009 | Eaton et al. | 382/103 |
| 2010/0111370 A1 | * | 5/2010 | Black et al. | 382/111 |
| 2010/0215259 A1 | * | 8/2010 | Scalise et al. | 382/164 |

\* cited by examiner

*Primary Examiner* — Jingge Wu
(74) *Attorney, Agent, or Firm* — James J. DeCarlo; Greenberg Traurig, LLP

(57) ABSTRACT

An example of a method of identifying objects having desired characteristics includes obtaining images of objects and metadata associated with each image. Further, the method includes automatically initializing a portion of the each image as at least one of a foreground portion and a background portion according to the metadata associated with the each image. Furthermore, the method includes segmenting the each image into the foreground portion and the background portion. In addition, the method includes determining at least one foreground portion depicting an object of the desired characteristics. Further, the method includes electronically providing an image corresponding to the at least one foreground portion.

21 Claims, 6 Drawing Sheets

IMAGE SEGMENTATION

BACKGROUND

Various applications, for example internet shopping, require searching images based on color. In order to search an image by color the image needs to be associated with one or more colors. The association can be performed by segmenting the image into a foreground portion and a background portion, and identifying the colors from the foreground portion. Often, segmentation techniques require user intervention to initialize the foreground and the background portion. For complex images effort of user intervention needed is high. For example, the user needs to initialize Trimap T={Tb, Tf, Tu}, where Tb is the background portion, Tf is the foreground portion and Tu is unknown portion in the image. Further, the segmenting becomes unmanageably complex when thousands of images are processed.

In light of foregoing discussion there is a need for an efficient technique for segmenting images.

SUMMARY

Embodiments of the disclosure described herein provide an article of manufacture, a method, and a system for image segmentation.

An example of an article of manufacture includes a machine-readable medium. Further, the machine-readable medium carries instructions operable to cause a programmable processor to perform obtaining images of objects and metadata associated with each image. A portion of the each image is automatically initialized as at least one of a foreground portion and a background portion according to the metadata associated with the each image. The each image is then segmented into the foreground portion and the background portion. Further, at least one foreground portion depicting an object of the desired characteristics is determined. Furthermore, an image corresponding to the at least one foreground portion is provided.

An example of a method of identifying objects having desired characteristics includes receiving electronically, in a computer system, a request for objects having desired characteristics. The method includes obtaining images of objects and metadata associated with each image. Further, the method includes automatically initializing a portion of the each image as at least one of a foreground portion and a background portion according to the metadata associated with the each image. Furthermore, the method includes segmenting the each image into the foreground portion and the background portion. In addition, the method includes determining at least one foreground portion depicting an object of the desired characteristics. Further, the method includes electronically providing an image corresponding to the at least one foreground portion.

An example of a system for identifying objects having desired characteristics includes one or more remote electronic devices. Further, the system includes a communication interface in electronic communication with the one or more remote electronic devices for receiving a request for an object having the desired characteristics. Furthermore, the system includes one or more storage devices for storing images of objects. In addition, the system includes a memory for storing instructions. Further, the system includes a processor responsive to the instructions to automatically segment each image into a foreground portion and a background portion, to determine at least one foreground portion depicting the object having the desired characteristics, and to provide an image corresponding to the at least one foreground portion.

BRIEF DESCRIPTION OF THE FIGURES

The illustrative examples in drawings are not necessarily drawn to scale. Further, the boundaries in the drawings are not necessarily accurate.

DETAILED DESCRIPTION OF THE EMBODIMENTS

Figure 1:
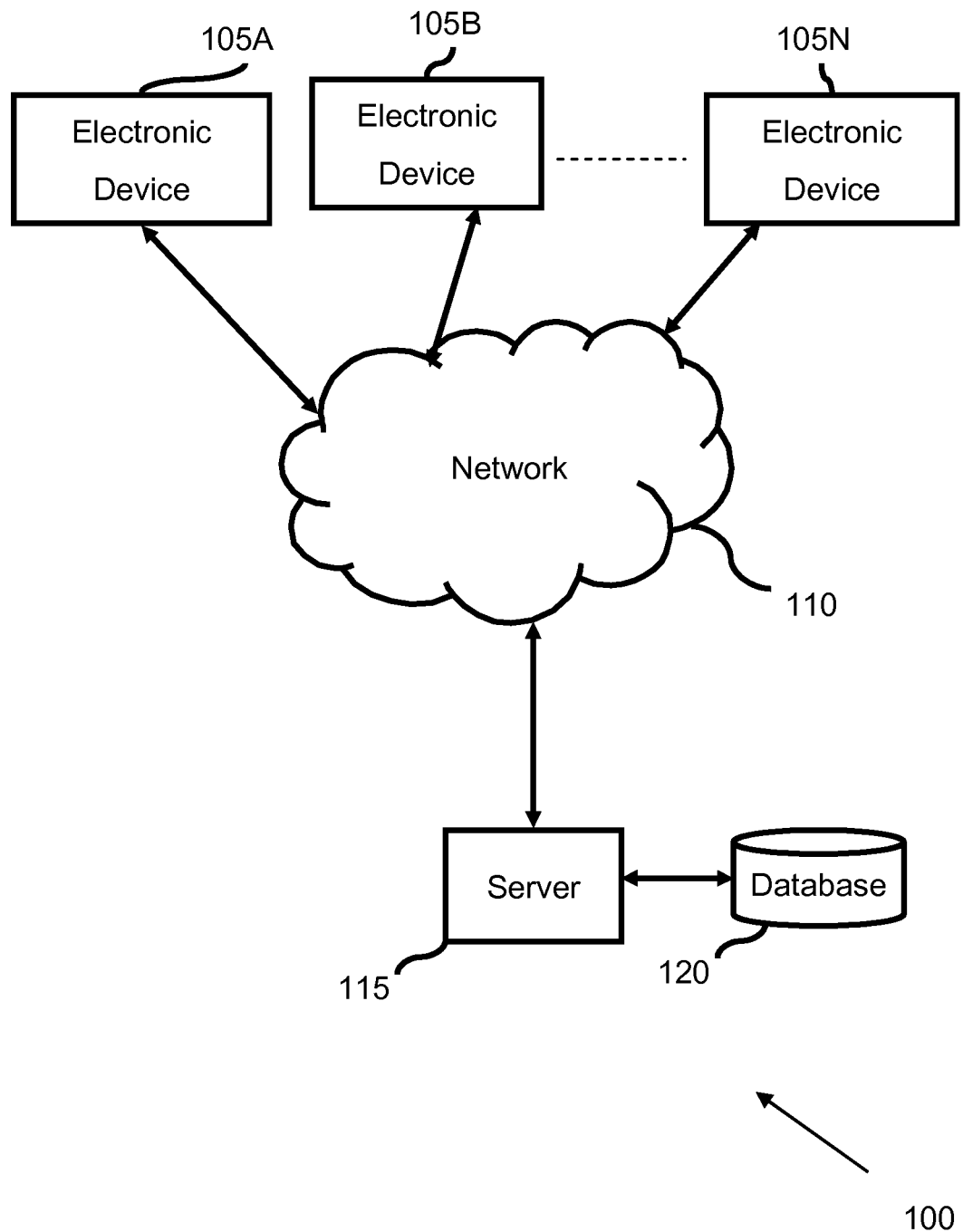
FIG. 1 is a block diagram of an environment, in accordance with which various embodiments can be implemented.

FIG. 1 is a block diagram of an environment 100, in accordance with which various embodiments can be implemented. The environment 100 includes one or more electronic devices, for example an electronic device 105A, an electronic device 105B and an electronic device 105N connected to each other through a network 110. Examples of the electronic devices include, but are not limited to, computers, mobile devices, laptops, palmtops, and personal digital assistants (PDAs). Examples of the network 110 include, but are not limited to, a Local Area Network (LAN), a Wireless Local Area Network (WLAN), a Wide Area Network (WAN), wired network, wireless network, internet and a Small Area Network (SAN). Examples of a protocol used for communication by the electronic devices include, but are not limited to, an internet protocol, a wireless application protocol (WAP), Bluetooth, zigbee, infrared and any protocol applicable for communicating data.

The electronic devices are connected to a server 115 through the network 110. In some embodiments, the electronic devices can be directly connected to the server 115. The server 115 is connected to a database 120.

The server 115 receives a request for identifying objects having desired characteristics from at least one electronic device, for example the electronic device 105A. Further, the server 115 obtains images of the objects and metadata, associated with each image from the database 120. The server 115 automatically initializes a portion of the each image as at least one of a foreground portion and a background portion based on the metadata associated with the each image. Further, the server 115 segments the each image into the foreground portion and the background portion using various segmentation techniques. Examples of the segmentation techniques include, but are not limited to, a GrabCut technique, Graph Cut, Bayes Matting, and Intelligent Scissors.

Figure 2:
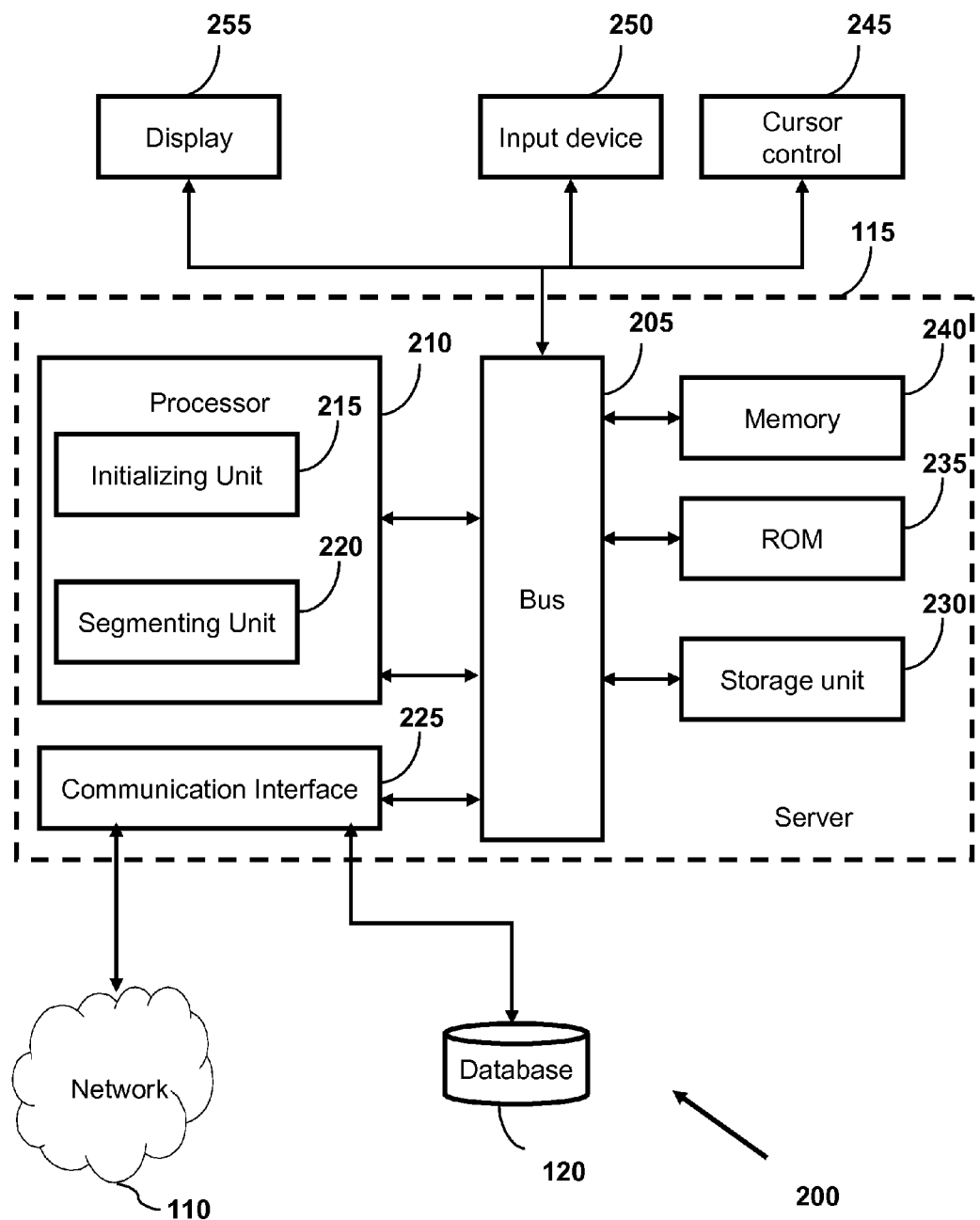
FIG. 2 is a block diagram of a server, in accordance with one embodiment.

FIG. 2 is a block diagram of the server 115, in accordance with one embodiment.

The server 115 includes a bus 205 or other communication mechanism for communicating information, and a processor 210 coupled with the bus 205 for processing information. The processor 210 can be a hardwired circuit which performs functions in response with instructions. The server 115 also includes a memory 240, such as a random access memory (RAM) or other dynamic storage device, coupled to the bus 205 for storing information and instructions to be executed by the processor 210. The memory 240 can be used for storing temporary variables or other intermediate information. The server 115 further includes a read only memory (ROM) 235 or other static storage device coupled to the bus 205 for storing static information and instructions for the processor 210. A storage unit 230, such as a magnetic disk or optical disk, is provided and coupled to the bus 205 for storing information and instructions.

The server 115 can be coupled via the bus 205 to a display 255, for example a cathode ray tube (CRT) display, a liquid crystal display (LCD), a light emitting diode (LED) display, for displaying information to a user. An input device 250, including alphanumeric and other keys, is coupled to the bus 205 for communicating information and command selections to the processor 210. Another type of user input device is a cursor control 245, such as a mouse, a trackball, or cursor direction keys for communicating direction information and command selections to the processor 210 and for controlling cursor movement on the display 255.

Various embodiments are related to the use of the server 115 for implementing the techniques described herein. In one embodiment, the techniques are performed by the processor 210 using information and executing instructions included in the memory 240. Execution of the instructions included in memory 240 causes processor 210 to perform the process steps described herein. The information can be read into the memory 240 from another machine-readable medium, such as the storage unit 230.

The term "machine-readable medium" as used herein refers to any medium that participates in providing data that causes a machine to operate in a specific fashion. In an embodiment implemented using the server 115, various machine-readable medium are involved, for example, in providing instructions to the processor 210 for execution. The machine-readable medium can be a storage media. Storage media includes both non-volatile media and volatile media. Non-volatile media includes, for example, optical or magnetic disks, such as the storage unit 230. Volatile media includes dynamic memory, such as the memory 240. All such media must be tangible to enable the information carried by the media to be detected by a physical mechanism that reads the information into a machine.

Common forms of machine-readable medium include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge.

In another embodiment, the machine-readable medium can be a transmission media including coaxial cables, copper wire and fiber optics, including the wires that include the bus 205. Transmission media can also take the form of acoustic or light waves, such as those generated during radio-wave and infrared data communications.

The server 115 also includes a communication interface 225 coupled to the bus 205. The communication interface 225 provides a two-way data communication coupling to a network 110. For example, communication interface 225 can be an integrated services digital network (ISDN) card or a modem to provide a data communication connection to a corresponding type of telephone line. As another example, communication interface 225 can be a local area network (LAN) card to provide a data communication connection to a compatible LAN. Wireless links can also be implemented. In any such implementation, communication interface 225 sends and receives electrical, electromagnetic or optical signals that carry digital data streams representing various types of information. The facsimiles can be received by the server 115 through the communication interface 225. The server 115 is in electronic communication with other electronic devices through the communication interface 225 and the network 110.

In some embodiments, the processor 210 may include an initializing unit 215 for processing the automatic initialization of at least one object having desired characteristics into a portion of images of objects as at least one of a foreground portion and a background portion. Further, the automatic initialization is performed using metadata associated with each image. Examples of the desired characteristics include, but are not limited to, category and colors of the objects.

The segmenting unit 220 segments the each image into the foreground portion and the background portion. Furthermore, the segmented image is displayed using the display 255.

In some embodiments, the processor 210 may not include the initializing unit 215 and the segmenting unit 220. The functions of the initializing unit 215 and the segmenting unit 220 are performed by the processor 210.

Figure 3:
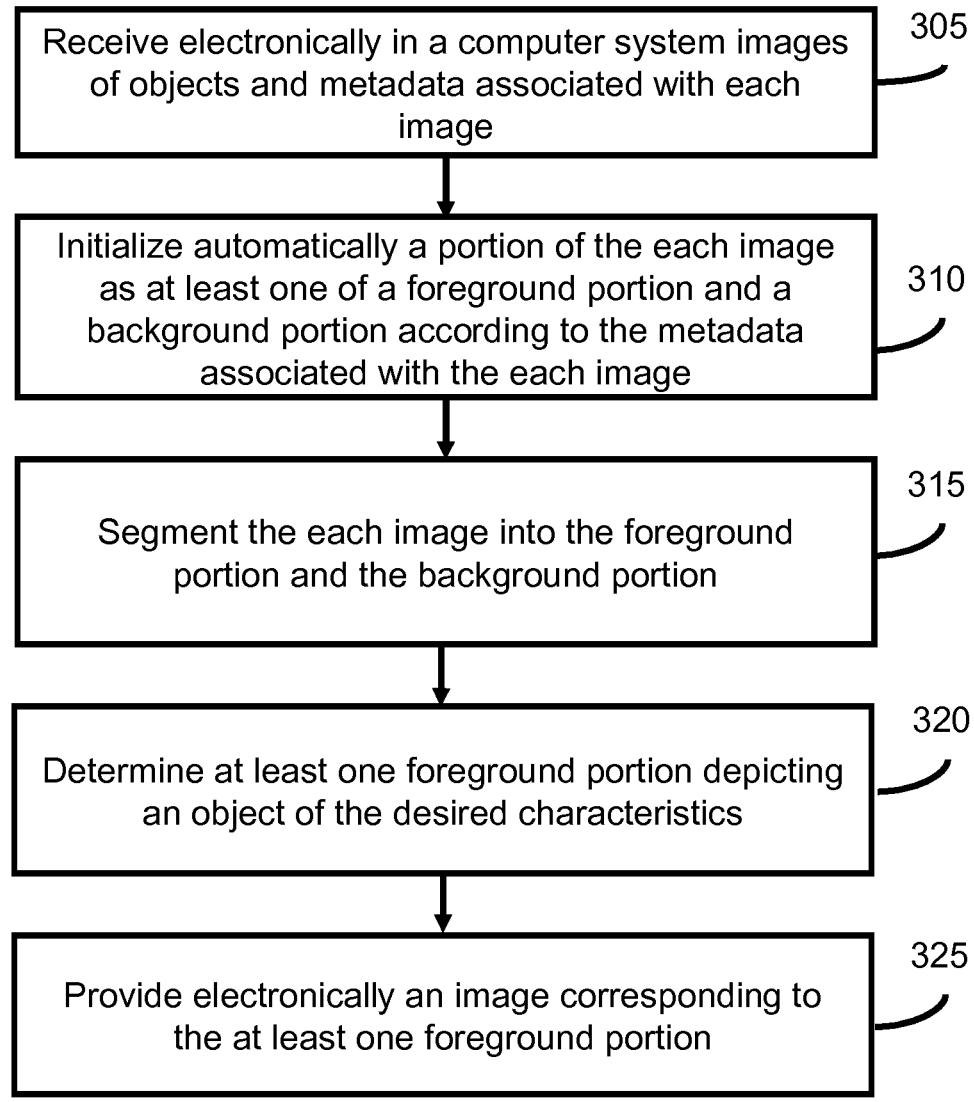
FIG. 3 is a flowchart illustrating a method of identifying objects having desired characteristics, in accordance with one embodiment.

FIG. 3 is a flowchart illustrating a method of identifying objects having desired characteristics, in accordance with one embodiment.

At step 305, images of objects and metadata associated with each image are obtained. Examples of the desired characteristics include, but are not limited to, colors and category of the objects. Examples of the category of the objects include, but are not limited to, a shirt, a pant, and a floral object.

The images can be obtained in a computer system in response to a request sent by a user for objects having desired characteristics. The user uses an online application, for example internet shopping, running on an electronic device for purchasing objects. The user may require searching images of the objects or the objects on the online application. The user specifies the desired characteristics of the objects which are sent as the request to the computer system by the electronic device of the use. Examples of the online applications include, but are not limited to, Yahoo!® Search.

In some embodiments, the images can be stored in distributed environment and can be fetched by the computer system in response to the request.

At step 310, a portion of the each image is automatically initialized as at least one of a foreground portion and a background portion according to the metadata associated with the each image.

The automatic initialization is performed by estimating the locations of the foreground and the background portions in an image, based on empirical observations. For example, skin color is automatically identified by using various skin tone models in an image and the portion corresponding to the skin color is initialized as the background portion. Examples of the various skin tone models include, but are not limited to, the model provided in the publication titled, "Statistical color models with application to skin detection" by Michael J. Jones and James M. Rehg published in International Journal of Computer Vision archive, Volume 46, Issue 1 (January 2002) table of contents, Pages: 81-96, Year of Publication: 2002; and the model provided in the publication titled, "Finding Naked People" by Margaret M. Fleck, David A. Forsyth and Chris Bregler published in Lecture Notes In Computer Science; Vol. 1065, archive, Proceedings of the 4th European Conference on Computer Vision—Volume II—Volume II table of contents, Pages: 593-602, Year of Publication: 1996, which are incorporated herein by reference. Further, if a floral image includes green portions then the green portions are initialized as the background portion. Moreover, the red, green and blue color channels of the image are transformed to log-opponent channels I, Rg, By by using the following exemplary equations:

$$L(x)=105 \log_{10}(x+1);$$

$$I=L(G);$$

$$Rg=L(R)-L(G);$$

$$By=L(B)-[L(G)+L(R)]/2;$$

$$H=\tan^{-1}(Rg/By); \text{ and}$$

$$S=(Rg^2+Bn^2)^{1/2}.$$

The intensity information is captured by the I channel and the color information is captured by Rg and By channels. The decision portion for skin portion is: (110<H<150,20<S<60) or (130<H<170, 30<S<130).

The automatic initializing is performed based on the metadata of the object. The metadata includes color of the object and category of the object. The automatic initializing of various categories is explained with the help of examples below.

Example 1

Category of the Object is Shirt

An image including a shirt is automatically initialized by identifying corner portions of the image as the background portion. The skin color present in the image is also identified using various skin tone models and initialized as the background portion. A central portion, for example a blob of 5*5 in the center, of the image is initialized as the foreground portion. The central portion can be predefined and can be proportionate to the dimensions of the image.

Example 2

Category of the Object is Pant

An image including a pant is automatically initialized by identifying corner portions of the image as the background portion. The skin color present in the image is also identified using the various skin tone models and initialized as the foreground portion. Edges present in the pant image are identified using various edge detectors and blobs around the edges are initialized as the foreground portion. Examples of the edge detectors include, but are not limited to, canny edge detector.

Example 3

Category of the Object is Floral

An image including a floral is automatically initialized by identifying corner portions of the image as the background portion. The green color textured patches present in the floral image is also identified and initialized as the background portion. The automatic initialization performed in the floral image may not require initializing the foreground portion.

In some embodiments, the green color can be detected by using color spaces, for example, opponent color space, HSV (hue, saturation, value), HSL (hue, saturation, lightness) and RGB (red, green, blue). A color model is a mathematical model describing the way colors can be represented as multiples of numbers, typically as three or four values of color components. When the color model is associated with a precise description of how the color components are to be interpreted, for example in viewing conditions, the resulting set of colors is called color space.

For example, the automatic initialization performed in the floral image can use the method of transforming pixels in RGB color space of the floral image into opponent space using:

$$i=(R+B+G)/3;$$

$$o1=(R+G-2*B)/4+0.5; \text{ and}$$

$$o2=(R+B-2*G)/4+0.5.$$

Each pixel's i, o1 and o2 values of the floral image are checked to see whether they fall in the ranges specified below: 40<i<80 and 10<o1<35 and −30<o2<0.

Each pixel which is in the range is classified as green pixel and each pixel which is not in the range is classified as non-green pixel.

At step 315, the each image is segmented into the foreground portion and the background portion. The automatically initialized portions are considered as inputs for the segmentation. The segmentation can be performed using various segmenting techniques. Examples of the segmenting techniques include, but are not limited to, GrabCut technique, Graph Cut, Bayes Matting, and Intelligent Scissors.

In some embodiments, based on the initialization an initial segmentation model is built which builds a color distribution. The color distribution can then be extended throughout the picture to initialize the color pixels matching the color of the foreground portion as the foreground portion. Similar approach can be used for the background portion. The foreground portion and the background portion are then segmented.

At step 320, at least one foreground portion depicting an object of the desired characteristics is determined. Each foreground portion can be checked and the foreground portions meeting the desired color and desired category of the object is selected as the foreground portion depicting object of the desired characteristic. The color of the foreground is considered to be the color of the image and the object.

In some embodiments, the images of the objects are tagged with the colors and the categories, and stored. When a request for objects with desired characteristics is received from the user then the tags can be checked to determine the objects of the desired characteristics. The foreground can include one or more colors and hence, the image can be tagged with the one or more colors.

At step 325, an image corresponding to the at least one foreground portion is provided electronically. The image includes the object having the desired characteristics.

In some embodiments, the user after looking at the image may purchase the object included in the image. A transaction can be made by the user and the object can then be delivered to the user.

It will be appreciated that the method of automatically initializing and segmenting the image can be used in various applications, for example applications in which the image needs to be associated with a color.

Figure 4:
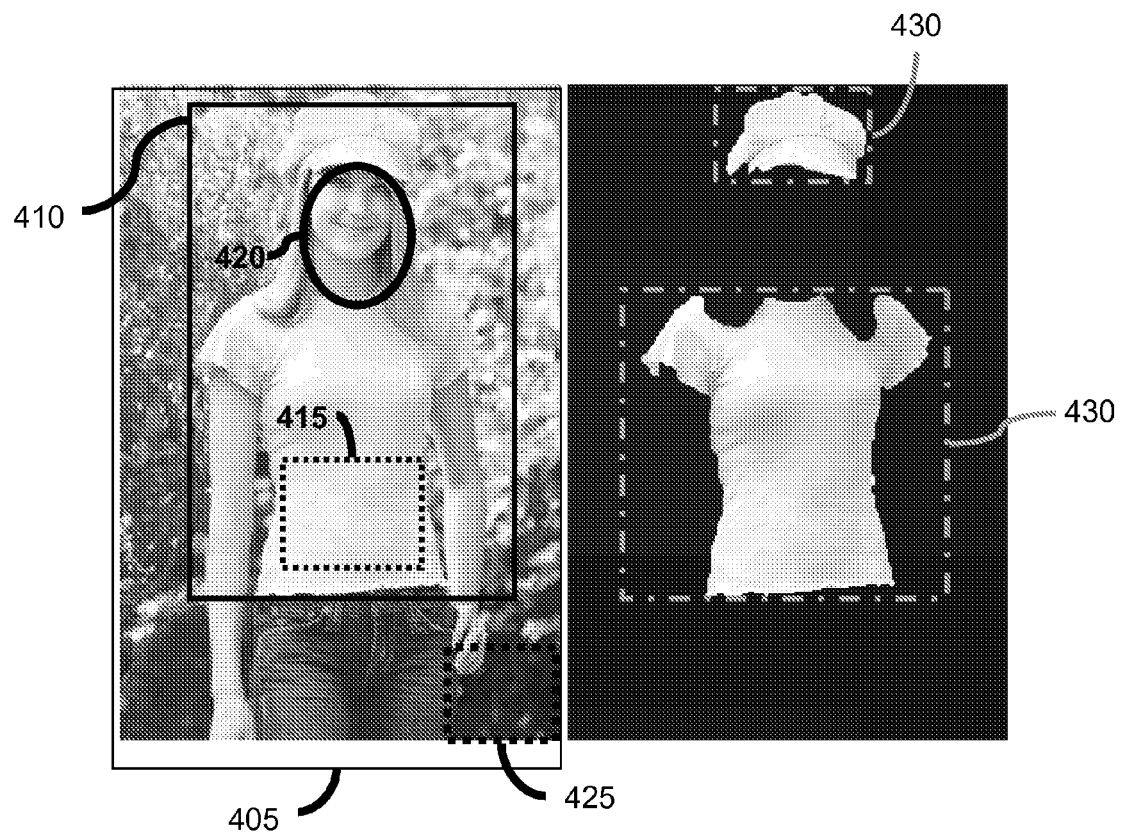
FIG. 4 is an exemplary screen shot of image segmentation, in accordance with one embodiment.

FIG. 4 is an exemplary screen shot of image segmentation, in accordance with one embodiment.

FIG. 4 includes an image 405. The image includes a shirt portion 410. A central portion 415, for example a blob of 5*5, of the shirt portion 410 is detected and automatically initialized as the foreground portion. The skin portions, for example a skin portion 420, present in the shirt portion 410 are detected using various skin tone models and are automatically initialized as the background portion. Further, the corners, for example a corner 425, of the shirt portion 410 are also automatically initialized as the background portion.

The image 405 is then segmented into the foreground portion and the background portion. The segmentation results in a foreground portion, for example a foreground portion 430. The image 405 is associated or tagged with the color of the foreground 430.

In the illustrated example, based on initialization an initial segmentation model can be built during segmentation. For example, building a color distribution for the automatic initialization of the foreground portions and background portions. The color distribution can be extended throughout the image to initialize the color pixels matching the color of the foreground portion as the foreground portion. For example, the foreground 430 matches the foreground color distribution and is initialized as the foreground portion.

The initial segmentation model is built with all the known background pixels as the background portion and known foreground portion as the foreground portion. Further, Gaussian Mixture Models (GMMs) are created for initial foreground and background classes. Each pixel in the foreground class is assigned to the Gaussian component in the foreground GMM and each pixel in the background class is assigned to the Gaussian component in the background GMM and is assigned to background GMM. New GMM's can be learnt from the new pixel allocation. New tentative allocation of foreground pixel and background pixel is performed using graph cut. The process followed in the GMM is repeated until the classification converges. In the process of assignment the best fit assignment in the GMM and where segmentation converges can be considered as the final assignment.

In FIG. 4, the cap region is also assigned as foreground. This is because the initially unassigned regions (cap regions) well fit the foreground GMMs and with this assignment the segmentation converges.

Figure 5:
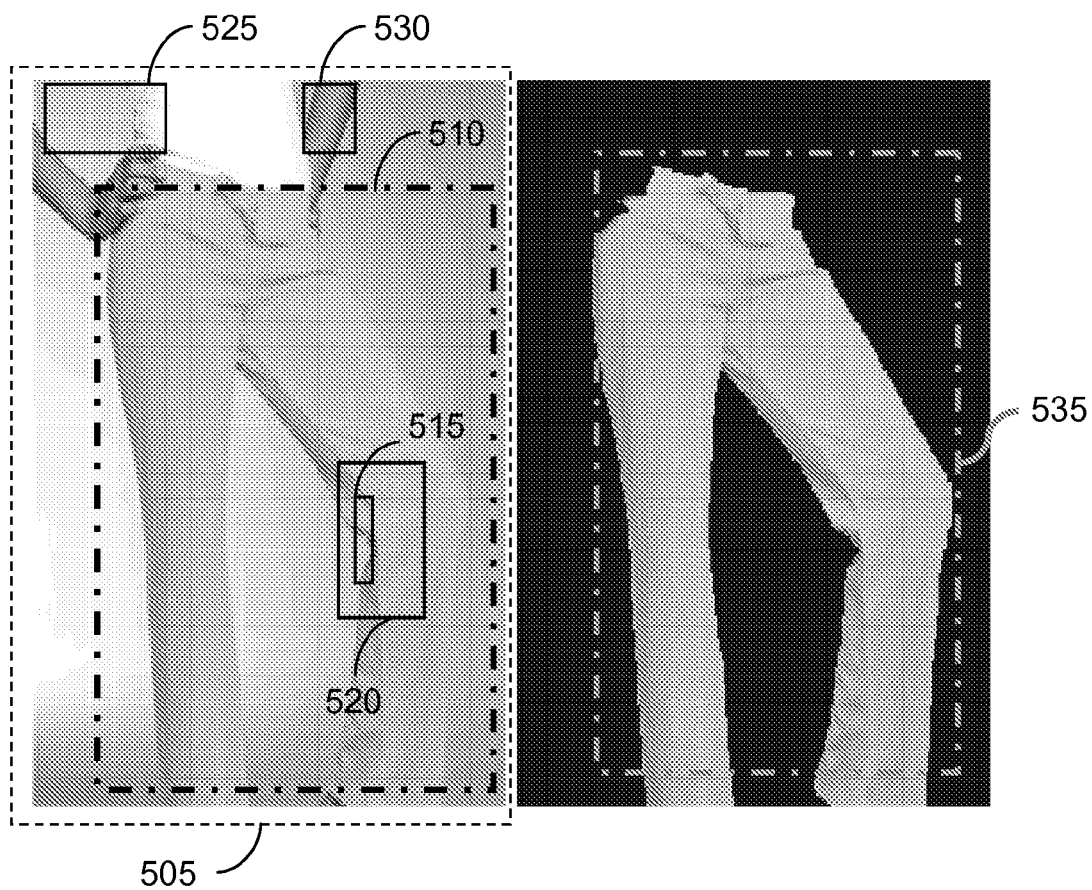
FIG. 5 is an exemplary screen shot of image segmentation, in accordance with another embodiment.

FIG. 5 is an exemplary screen shot of image segmentation, in accordance with another embodiment.

FIG. 5 includes an image 505. The image includes a pant portion 510. Edges present in the pant portion 510, for example an edge portion 515, are identified using various edge detectors and blobs around the edges, for example a blob 520 are initialized as the foreground portion. Examples of the edge detectors include, but are not limited to, canny edge detectors. The corners, for example a corner 525, of the pant portion 510 are also automatically initialized as the background portion. The skin portion, for example a skin portion 530, present in the pant portion 510 is detected using various skin tone models and is automatically initialized as the background portion. The segmentation results in a foreground portion for example a foreground portion 535. The image 505 is associated or tagged with the color of the foreground 535.

Figure 6:
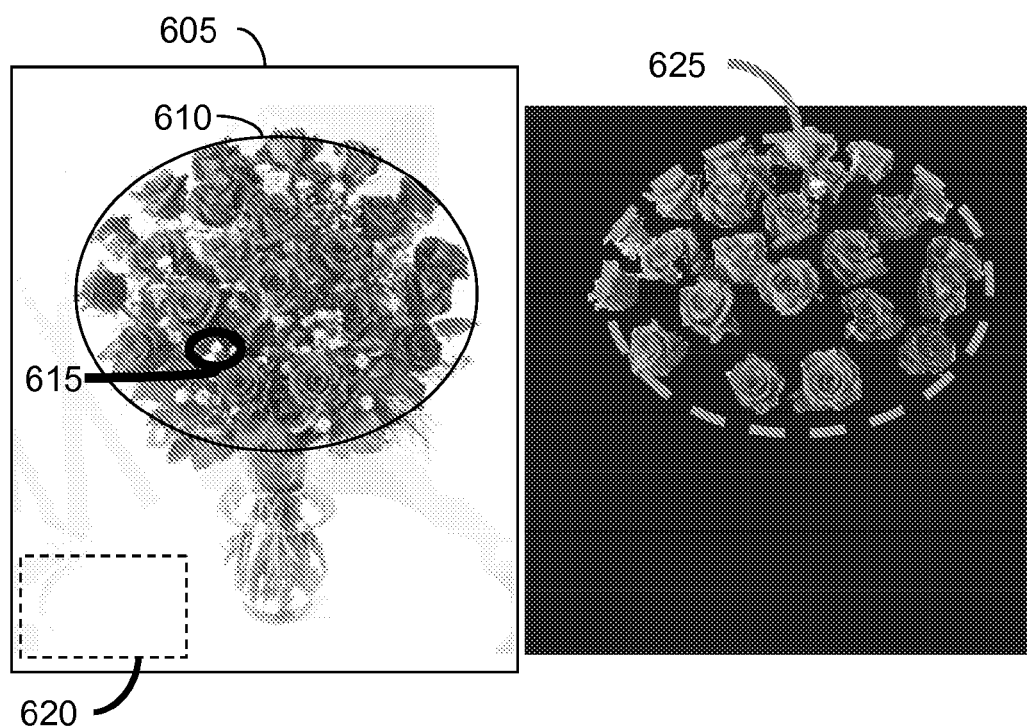
FIG. 6 is an exemplary screen shot of image segmentation, in accordance with yet another embodiment.

FIG. 6 is an exemplary screen shot of image segmentation, in accordance with yet another embodiment.

FIG. 6 includes an image 605. The image includes a floral portion 610. The green texture, for example a texture 615 is detected in the image 605 and the green texture is automatically initialized as the background portion. Further, the corners, for example a corner 620, of the floral image are also automatically initialized as the background portion. The image 605 is then segmented into the foreground portion and the background portion. The segmentation results in a foreground 625. The image 605 is associated or tagged with the color of the foreground 625.

While exemplary embodiments of the present disclosure have been disclosed, the present disclosure may be practiced in other ways. Various modifications and enhancements may be made without departing from the scope of the present disclosure. The present disclosure is to be limited only by the claims.

What is claimed is:

1. An article of manufacture comprising:
a non-transitory machine-readable medium; and
instructions carried by the medium and operable to cause a programmable processor to perform:
obtaining images of objects and metadata associated with each image;
automatically initializing a portion of the each image as at least one of a foreground portion and a background portion according to the metadata associated with the each image, and based on empirical observations for identifying a portion of an image based on models;
segmenting the each image into the foreground portion and the background portion, the segmenting including:
building an initial segmentation model,
initializing pixels matching the foreground portion and the background portion, and
repeating pixel allocation until classification of foreground and background pixels converges;
determining at least one foreground portion depicting an object of the desired characteristics; and
providing an image corresponding to the at least one foreground portion.

2. The article of manufacture of claim 1, wherein the desired characteristics comprises:
category and color of the object.

3. The article of manufacture of claim 1, wherein the automatically initializing comprises:
identifying corner portions of the image as the background portion.

4. The article of manufacture of claim 1, wherein the automatically initializing comprises:
identifying portions associated with skin color as the background portion.

5. The article of manufacture of claim 1, wherein the automatically initializing comprises:
identifying central portion of the image as the foreground portion.

6. The article of manufacture of claim 1, wherein the automatically initializing comprises:
identifying edges associated with the image from the metadata; and
determining portions around the edges as the foreground portion.

7. The article of manufacture of claim 1, wherein the automatically initializing comprises:
detecting a color texture in the image; and
identifying portions associated with the color texture as the background portion.

8. The article of manufacture of claim 1, wherein the segmenting is performed based on GrabCut technique.

9. The article of manufacture of claim 1, wherein the segmenting comprises:
building a color distribution; and
identifying portions of the image matching a color based on the color distribution as the foreground portion.

10. The article of manufacture of claim 1 further comprising instructions operable to cause a programmable processor to perform:
identifying one or more colors in the foreground portion; and
associating the image with the one or more colors.

11. A method of identifying objects having desired characteristics, the method comprising:
receiving electronically, in a computer system, a request for objects having desired characteristics;
obtaining images of objects and metadata associated with each image;
automatically initializing a portion of the each image as at least one of a foreground portion and a background portion according to the metadata associated with the each image and based on empirical observations for identifying a portion of an image based on models;
segmenting the each image into the foreground portion and the background portion, the segmenting including:
building an initial segmentation model,
initializing pixels matching the foreground portion and the background portion, and
repeating pixel allocation until classification of foreground and background pixels converges;
determining at least one foreground portion depicting an object of the desired characteristics; and
electronically providing an image corresponding to the at least one foreground portion.

12. The method of claim 11, wherein the desired characteristics comprise:
category and color of the object.

13. The method of claim 11, wherein the automatically initializing comprises:
identifying corner portions of the image as the background portion.

14. The method of claim 11, wherein the automatically initializing comprises:
identifying portions associated with skin color as the background portion.

15. The method of claim 11, wherein the automatically initializing comprises:
identifying central portion of the image as the foreground portion.

16. The method of claim 11, wherein the automatically initializing comprises:
identifying edges associated with the image from the metadata; and
determining portions around the edges as the foreground portion.

17. The method of claim 11, wherein the automatically initializing comprises:
identifying a color texture in the image; and
determining portions associated with the color texture as the background portion.

18. The method of claim 11, wherein the segmenting is performed based on GrabCut technique.

19. The method of claim 11, wherein the segmenting comprises:
building a color distribution; and
identifying portions of the image matching a color based on the color distribution as the foreground portion.

20. The method of claim 11 further comprising:
identifying one or more colors in the foreground portion;
associating the image with the one or more colors.

21. A system for identifying objects having desired characteristics, the system comprising:
one or more remote electronic devices;
a communication interface in electronic communication with the one or more remote electronic devices for receiving a request for an object having the desired characteristics;
one or more storage devices for storing images of objects;
a memory for storing instructions; and
a processor responsive to the instructions to automatically initialize a portion of the each image as at least one of a foreground portion and a background portion according to the metadata associated with the each image, and based on empirical observations for identifying a portion of an image based on models, and to automatically segment each image into a foreground portion and a background portion, the segmenting including:
building an initial segmentation model,
initializing pixels matching the foreground portion and the background portion, and
repeating pixel allocation until classification of foreground and background pixels converges,
to determine at least one foreground portion depicting the object having the desired characteristics, and
to provide an image corresponding to the at least one foreground portion.

* * * * *